United States Patent [19]

Bartholomew

[11] Patent Number: 5,031,559
[45] Date of Patent: Jul. 16, 1991

[54] MEANS OF PROVIDING AN AIR LAYER BETWEEN A LIQUID AND SOLID SURFACE TO REDUCE DRAG FORCES

[75] Inventor: Donald D. Bartholomew, Marine City, Mich.

[73] Assignee: Proprietary Technology, Inc., Southfield, Mich.

[21] Appl. No.: 465,058

[22] Filed: Jan. 16, 1990

[51] Int. Cl.$^5$ .............................................. B63B 1/34
[52] U.S. Cl. ................................... 114/67 A; 138/148
[58] Field of Search .............. 114/56, 57, 67 R, 67 A; 244/126, 200, 207; 138/140, 147, 148; 180/116, 117, 118, 119, 125

[56] References Cited

U.S. PATENT DOCUMENTS

| | | | |
|---|---|---|---|
| 1,066,732 | 7/1913 | Johnson | 114/67 A |
| 1,894,256 | 1/1933 | De Ganahl et al. | 114/67 A |
| 2,145,463 | 1/1939 | Spinanger | 114/67 A |
| 3,014,353 | 12/1961 | Scully et al. | 114/67 A |
| 3,124,322 | 3/1964 | Cockerell . | |
| 3,168,928 | 2/1965 | Ljungstrom . | |
| 3,205,847 | 9/1965 | Smith | 114/67 A |
| 3,297,280 | 1/1967 | Lee . | |
| 3,547,064 | 12/1970 | Glass . | |
| 3,650,235 | 3/1972 | Swanson . | |
| 3,732,839 | 5/1973 | Schuster et al. . | |
| 3,874,315 | 4/1975 | Wright . | |
| 4,428,989 | 1/1984 | Marshall | 114/67 A |
| 4,643,268 | 2/1987 | Jones et al. | 114/67 A |
| 4,736,912 | 4/1988 | Loebert . | |

Primary Examiner—Sherman Basinger
Assistant Examiner—Stephen P. Avila
Attorney, Agent, or Firm—Harness, Dickey & Pierce

[57] ABSTRACT

A method and apparatus for reducing friction at the interface between a liquid and a solid. A solid interface member includes a plurality of apertures over the entire surface which are to be in contact with the liquid. The apertures are of a size and dimension such that the surface tension of the liquid will not allow the liquid to pass through the apertures, but which will allow a gaseous material with less surface tension than the liquid to pass therethrough. The gaseous material is thereafter motivated through the apertures to interpose a gaseous layer at the liquid solid interface which reduces the drag coefficient therebetween, which would otherwise result from relative motion between the solid interface member and the liquid.

13 Claims, 1 Drawing Sheet

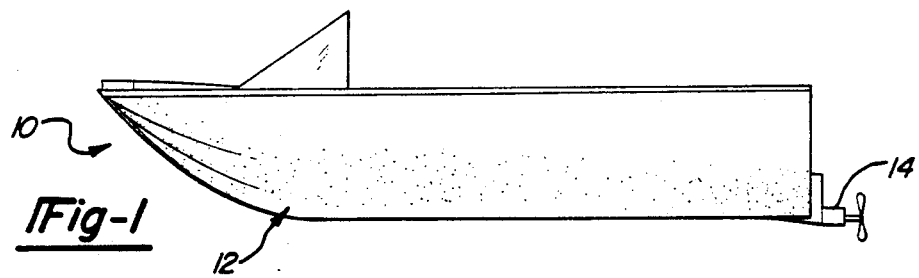
Fig-1
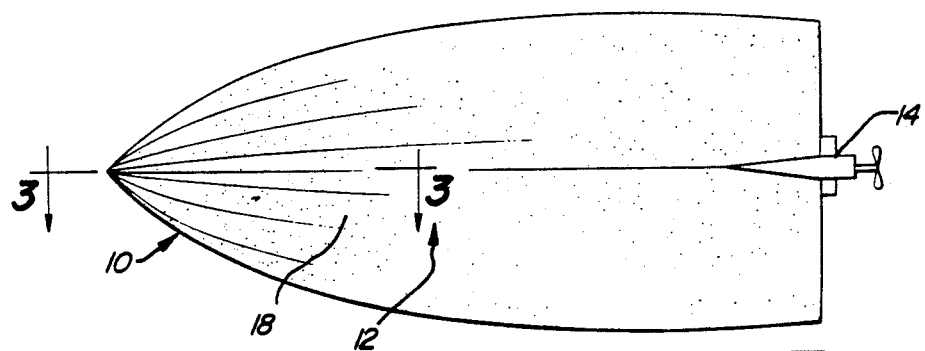
Fig-2
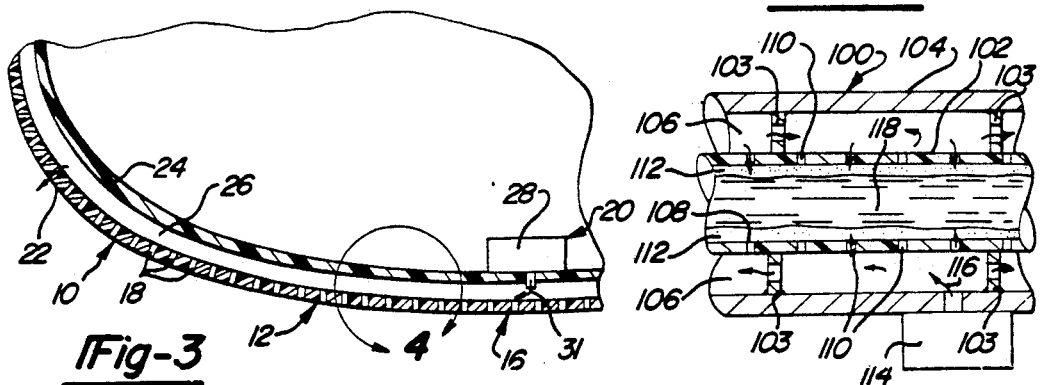
Fig-3
Fig-5
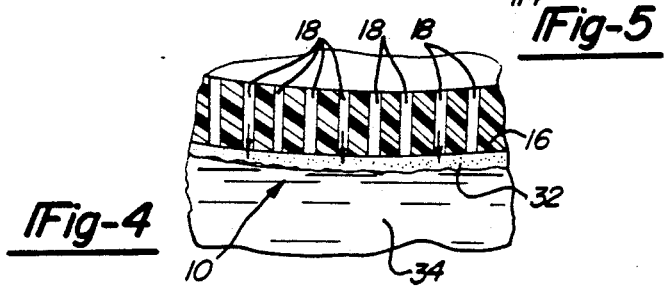
Fig-4

MEANS OF PROVIDING AN AIR LAYER BETWEEN A LIQUID AND SOLID SURFACE TO REDUCE DRAG FORCES

BACKGROUND AND SUMMARY OF THE INVENTION

The present invention relates to an apparatus and method for reducing drag forces at the interface between a liquid and a solid in relative motion between one another. More particularly, the present invention is directed to the use of the surface tension properties of a liquid in conjunction with a specialized solid material to provide an air layer between the liquid and the solid material to reduce friction therebetween.

In the past it has been known that it is desirable to reduce the friction created, for instance, by a boat hull running over water or a liquid flowing through a pipe, whereby the boat may move faster over the water or the liquid may be moved through a pipe with increased efficiency. While it has been known that the imposition of a gaseous layer, such as air, at the interface between the liquid and the solid will reduce friction between the boat hull, for example, and the water over which it is traveling, there remains room for improvement in structures which can provide such a friction reducing layer. In the past many of the methods used were to port air under pressure through relatively large holes in the boat hull to provide an air layer therebetween. While effective when the system was active, during periods of inactivity there was water intrusion into the holes. Thus, provisions had to be made to prevent the intrusion of water or to remove the unwanted water in order to operate the device.

In the present invention, the inventor has discovered that the large difference in the surface tension properties between liquids and gaseous materials can be utilized in a manner such that air may be easily transported to a solid/liquid interface from an air storage area in a way which does not allow liquid to flow back into the air storage area. This improves the efficiency in achieving relative motion between the solid and the liquid and solves the problem of unwanted liquid entering the system.

It is therefore an object of the present invention to take advantage of the difference in surface tension between a liquid and a gaseous material and form a suitable apparatus for imposing an air layer between the solid and the liquid layer to reduce drag forces during relative motion.

In accordance with the present invention there is provided an apparatus and method for reducing friction at the interface of a liquid which has a known surface tension and a solid interface member. The apparatus includes a solid interface member which has a plurality of apertures over its entire surface which is exposed to the liquid. The apertures are of a preselected size and dimension such that the surface tension of the liquid will not allow the liquid to pass through the interface but will allow a gaseous material with less surface tension than the liquid to pass through the apertures. A mechanism is provided for intperposing the gaseous material through the apertures at the liquid/solid interface to reduce the drag forces between the liquid and solid interface which would otherwise result from the relative motion between the liquid and the solid interface member.

Other advantages of the present invention will be readily appreciated as same becomes better understood in light of the following description when taken in connection with the accompanying drawings.

BRIEF DESCRIPTION OF THE DRAWINGS

FIG. 1 is a plan view of a boat having a hull incorporating the teachings of the present invention;

FIG. 2 is a bottom view of the hull of FIG. 1;

FIG. 3 is a sectional view taken along line 3—3 of FIG. 2 and partially broken away showing a portion of the boat hull made in accordance with the teachings of the present invention;

FIG. 4 is a detailed view of the lower hull portion in contact with a liquid surface utilizing the teachings of the present invention; and FIG. 5 is a cross-sectional view of a pipe construction incorporating the teachings of the present invention.

DETAILED DESCRIPTION OF THE INVENTION

Referring now to the drawings and particularly in FIG. 1, there is shown a means, generally shown at 10, for providing an air layer between liquid and solid interface to reduce drag forces in a boat. Most boats utilized today include a hull portion 12 and include some means for propulsion, generally indicated by propeller shown at 14.

Referring to FIG. 3, the boat hull 12 made in accordance with the teachings of the present invention includes a solid interface means, generally shown at 16, which includes a plurality of apertures 18 over at least 20% of the surface. In the illustrated embodiment substantially the entire surfaces of the solid interface means which is to come in contact with the water or liquid includes such apertures 18. The apertures 18 are of a preselected size and dimension such that the surface tension of the liquid, water in this case, will not allow the liquid to pass through the solid interface means 16 but which will allow a gaseous material, such as air, having less surface tension than the liquid to pass therethrough. Also incorporated in the present invention is a means, generally indicated at 20, for motivating the gaseous material, such as air, through the apertures at the liquid solid interface to reduce the drag forces between the solid interface means and the liquid which would otherwise result from the relative motion between the liquid and the apparatus.

In a preferred embodiment of the present invention an outer hull portion 22 is provided which is spaced from an inner hull portion 24 to provide a chamber 26 therebetween. The means 20 may include an air pump 28, such as shown in FIG. 3, which would pump air (see arrow 31) into the chamber 26 during relative movement between the hull and the water 34 to force air through apertures 18 and provide air 32 therebetween thereby reducing the drag coefficient between the hull and the water 34.

While an air pump for introducing air at the interface is preferred, it may be also possible to utilize the relative motion between the boat hull 12 and the water 34 which would thereby form a vacuum and actually draw air through the apertures 18 to provide the gaseous layer 32 for reducing the drag coefficient.

The apertures 18 are of such a size that the surface tension of the liquid effectively bridges the aperture such that even local pressure surges caused by the waves or movement of the boat over the water surface do not reach the pressures required to overcome the surface tension of the water and allow it to pass through the apertures. Thus, a boat hull made in accordance with the teachings of the present invention would be substantially free from leakage of water into the chamber 26 whether in motion or standing still on the water.

Referring now to FIG. 5 there is shown an alternate embodiment of an apparatus utilizing the teachings of the present invention in the form of a liquid transferring pipe, generally shown at 100. The Pipe 100 includes an inner housing 102 and an outer housing 104, interconnected by webs 103, which define a chamber 106 therebetween. A central opening 108 is provided for passing a liquid therethrough. The inner housing 102 includes a plurality of apertures 110 over its entire surface. The apertures 110 are again of a size and dimension, such that a surface tension of the liquid which is to flow through the pipe, will not pass through the apertures 110, even during relative movement therebetween but which will allow a gaseous material injected into chamber 106 to enter through the orifice 110 and provide a gaseous layer 112 between the surfaces forming the opening 108 of the inner housing 102 and the liquid 118 contained in the opening 108 thereby reducing the friction therebetween. Again, a pump 114 may be utilized to inject air (see arrow 116) into the chamber 106 to interpose the air layer 112 during relative motion between the liquid 118 and the inner housing 102. However, the air layer may also be provided by utilizing the vacuum created during pumping of liquid 118 through opening 108 to draw in a gaseous material for providing the air layer 112.

The size of the apertures 110 or 18 are determined according to the particular surface tension of the liquid and the rate of relative movement between the liquid and the solid. Suitable outer hull 22 or inner housing 102 constructions could be provided in several known ways such as by "drilling" thousands of minute holes in a suitably designed boat hull or pipe construction with a laser. Alternatively, micropore technology could be used to provide the proper aperture size for a particular use. It is conceivable that if a suitably strong material were available a boat hull could be provided with apertures so close together that one could see the water, without the water coming through the hull or leaking. One such suitable material for the outer hull 22 or in new housing 102 would be a woven or nonwoven cloth-like material wherein the apertures are formed by providing holes in the cloth-like material.

In accordance with the above teachings, the method of the present invention is a method for reducing the drag coefficient between a solid, and a liquid with a known surface tension in relative movement between one another. The method includes the steps of first providing a specially prepared solid which is to the in contact with a liquid and which will be in relative motion with the liquid. The solid member is of the type described above which includes a plurality of apertures therein in the surfaces which are to be in contact with the liquid. The apertures are such as those described which are of a size and dimension which will allow a gaseous fluid to pass therethrough but in which the surface tension of the liquid will not allow the liquid to pass through. The solid is thereafter placed in contact with the liquid. Relative motion is thereafter facilitated between the solid and the liquid and a gaseous layer is interposed at the interface between the solid and the liquid. The gaseous layer is provided by causing a flow of the gaseous fluid through the apertures during relative movement between the solid and liquid which reduces the drag coefficient at the interface.

While the above description constitutes the preferred embodiments of the present invention, it is to be appreciated that the invention is susceptible to modification, variation and change without departing from the proper scope and fair meaning of the accompanying claims.

What is claimed is:

1. An apparatus for reducing friction at the interface of a liquid having a surface tension and said apparatus, wherein it is desired that movement relative to one another is desired at said interface, said apparatus comprising:

a solid interface means for providing an interface between said apparatus and a liquid material via the interposition of a gaseous material therebetween, said interface means including a substantially fixed volume chamber having a relatively rigid and inflexible outer surface, said outer surface including a plurality of apertures therein which substantially cover the entirety of said outer surface, said apertures being of a preselected size and dimension such that the surface tension of liquid moving or not moving relative to said outer surface and substantially circumscribing said outer surface prevents said liquid from passing through the apertures in the solid interface means but which enables said gaseous material to pass therethrough, thereby enabling a gaseous layer to be formed intermediate said outer surface of said interface means and said liquid, thereby reducing the friction created between said outer surface and said liquid when said liquid is moving relative to said outer surface; and a means for motivating the gaseous material through the apertures for interposing a gaseous layer at the liquid/solid interface to reduce the drag forces between the liquid and said solid interface means which would otherwise result from the relative motion between the liquid and the solid interface means.

2. The apparatus of claim 1 wherein said means for motivating further comprises a vacuum formed between the liquid and the solid interface means during relative movement therebetween.

3. An apparatus for reducing friction between a boat hull and a water surface, said apparatus comprising:

a relatively rigid and inflexible outer hull portion of a boat and an inner wall portion of said boat, said outer hull and inner wall portions cooperating to define a substantially fixed volume chamber, said outer hull portion being operable to sustain the boat on the water surface, said outer hull portion including a plurality of apertures in at least 20% of its surface, which substantially cover the entirety of said surface, said apertures being of a size such that the surface tension of water moving or not moving relative to said outer hull portion and substantially circumscribing said outer wall portion apertures but enables a gaseous fluid with a surface tension less than that of water to pass through said apertures; and a means for motivating the gaseous fluid through said apertures during relative movement between said outer hull portion and the water, whereby a layer of said gaseous fluid is interposed inbetween said water and said outer hull portion to reduce the drag therebetween.

4. The apparatus of claim 3 wherein said means for motivating further comprises means for injecting said gaseous fluid into said chamber and for forcing said gaseous fluid through said apertures.

5. The apparatus of claim 3 wherein said means for motivating further comprises a means for providing relative movement between the outer hull and the water surface to thereby provide a vacuum for drawing said gaseous fluid through said apertures, to thereby interpose said layer of gaseous fluid inbetween said water and said outer hull portion.

6. The apparatus of claim 3 wherein said outer hull portion comprises a woven or nonwoven cloth-like material and said apertures comprise holes formed therein.

7. A pipe apparatus for reducing the friction between an inner surface of a pipe and a liquid flowing through the pipe, said apparatus comprising:
 a housing operatively associated with a pipe, said housing including a liquid transferring opening therein, said housing further including a wall portion having a plurality of apertures therein leading to the opening, said apertures being of a size whereby the surface tension of liquid moving or not moving through said pipe prevents the liquid from passing through said apertures but enables a gaseous fluid having a surface tension less than that of the liquid to pass through the apertures; and
 a means for motivating a gaseous fluid through substantially all of the apertures during movement of the liquid through the pipe, whereby a layer of said gaseous fluid formed inbetween the liquid and the wall portion of the housing, thereby reducing drag between the liquid and the housing during transmission of the liquid through the housing.

8. The pipe apparatus of claim 7 wherein said means for motivating further comprises means for moving said liquid through the pipe to thereby form a vacuum at an interface between the liquid and the wall portion of the housing, whereby said vacuum draws the gaseous fluid through the apertures to provide the gaseous layer inbetween the liquid and the wall portion of the housing.

9. The pipe apparatus of claim 7 wherein said housing comprises a woven or nonwoven cloth-like material and said apertures comprises holes formed in said cloth-like material.

10. A method for reducing the drag coefficient during relative movement between a solid, and a liquid, wherein the liquid has a known surface tension, the method comprising the steps of:
 (a) providing a solid, relatively inflexible member having a substantially fixed volume chamber with a plurality of apertures having dimensions such that the surface tension of the liquid will not allow the liquid to pass therethrough while said solid member is in contact with the liquid during periods of movement of the liquid relative to the solid member and periods of non-movement of the liquid relative to the solid member, said apertures further enabling a gaseous fluid with a surface tension less than that of the liquid to be passed therethrough;
 (b) placing said solid member in contact with the liquid;
 (c) facilitating relative movement between the solid and the liquid; and
 (d) interposing a layer of gaseous fluid at the interface between the solid and the liquid by causing a flow of gaseous fluid to pass through said apertures during relative movement between the solid member and the liquid, said layer of gaseous fluid providing a reduced coefficient of drag during said relative movement.

11. The method of claim 10 wherein step d is accomplished by pumping the gaseous fluid through the apertures in the solid.

12. The method of claim 11, wherein a vacuum is formed at the interface between said liquid and solid member; and
 wherein step d is accomplished by using the vacuum formed at the interface between the liquid and the solid to pull the gaseous fluid through said apertures to form said layer of gaseous fluid.

13. The method of claim 11 wherein said solid member comprises a woven or nonwoven cloth-like material, and wherein said apertures are formed by holes in said cloth-like material.

* * * * *

UNITED STATES PATENT AND TRADEMARK OFFICE
CERTIFICATE OF CORRECTION

PATENT NO. : 5,031,559
DATED : July 16, 1991
INVENTOR(S) : Donald D. Bartholomew It is certified that error appears in the above-identified patent and that said Letters Patent is hereby corrected as shown below:

Column 3, line 55, "the" should be --be--.

Column 4, lines 59 - 60, claim 3, after "portion", insert --prevents the water from passing through said--.

Signed and Sealed this

Fourth Day of May, 1993

Attest:

MICHAEL K. KIRK

*Attesting Officer*   *Acting Commissioner of Patents and Trademarks*